US012297077B2

(12) United States Patent
Lanz et al.

(10) Patent No.: US 12,297,077 B2
(45) Date of Patent: May 13, 2025

(54) CONSTRUCTION ARRANGEMENT OF AN ELEVATOR

(71) Applicant: Kone Corporation, Helsinki (FI)

(72) Inventors: Otto Lanz, Helsinki (FI); Matti Rasanen, Helsinki (FI); Markku Haapaniemi, Helsinki (FI); Anssi Venho, Helsinki (FI); Janne Laine, Helsinki (FI); Aki Haikonen, Helsinki (FI); Sakari Korvenranta, Helsinki (FI); Kai Guo, Helsinki (FI); XueSong Pan, Helsinki (FI); Jari Ryhanen, Helsinki (FI); Jaakko Kahila, Helsinki (FI); Jorma Mustalahti, Helsinki (FI); Mikko Kukkola, Helsinki (FI); Wen Sheng Luo, Helsinki (FI)

(73) Assignee: Kone Corporation, Helsinki (FI)

( * ) Notice: Subject to any disclaimer, the term of this patent is extended or adjusted under 35 U.S.C. 154(b) by 0 days.

(21) Appl. No.: 18/330,828

(22) Filed: Jun. 7, 2023

(65) Prior Publication Data

US 2023/0312307 A1 Oct. 5, 2023

Related U.S. Application Data

(63) Continuation of application No. PCT/CN2020/140835, filed on Dec. 29, 2020.

(51) Int. Cl.

| | |
|---|---|
| ***B66B 11/00*** | (2006.01) |
| ***B66B 11/04*** | (2006.01) |
| ***E04G 21/32*** | (2006.01) |

(52) U.S. Cl.

CPC ........ *B66B 11/0005* (2013.01); *B66B 11/043* (2013.01); *E04G 21/32* (2013.01)

(58) Field of Classification Search

CPC . B66B 11/043; B66B 11/0005; B66B 19/005; B66B 19/04; B66B 19/00; E04G 21/32

See application file for complete search history.

(56) References Cited

U.S. PATENT DOCUMENTS

| | | | | |
|---|---|---|---|---|
| 2008/0308362 A1* | 12/2008 | Tucker | B66B 19/00 | 187/414 |
| 2010/0068005 A1 | 3/2010 | Wurth | | |
| 2014/0000987 A1* | 1/2014 | Peacock | B66B 9/187 | 187/414 |

FOREIGN PATENT DOCUMENTS

| | | |
|---|---|---|
| CN | 109415186 A | 3/2019 |
| EP | 2636629 B1 | 5/2015 |

(Continued)

OTHER PUBLICATIONS

Machine Translation of WO 2018/099761.*

(Continued)

*Primary Examiner* — Diem M Tran

(74) *Attorney, Agent, or Firm* — Harness, Dickey & Pierce, P.L.C.

(57) ABSTRACT

A construction arrangement of an elevator including a hoistway; a protection deck mounted inside the hoistway for protecting the portion of the hoistway below it from falling objects; wherein the protection deck includes a cover extending across the hoistway covering the hoistway such that it blocks objects from falling into the hoistway below it; and a frame mounted on stationary structures of the hoistway; and a hoisting apparatus for hoisting construction material below the protective deck. The hoisting apparatus is supported by the protective deck, the hoisting apparatus includes a hoisting machine mounted on protection deck, and a flexible tension member movable with the hoisting machine.

12 Claims, 4 Drawing Sheets

(56) References Cited

FOREIGN PATENT DOCUMENTS

| | | | | | |
|---|---|---|---|---|---|
| EP | 3388379 | A1 | | 10/2018 | |
| WO | WO-2015/003964 | A1 | | 1/2015 | |
| WO | WO-2018099761 | A1 | * | 6/2018 | ......... B66B 11/0005 |
| WO | WO-2021186493 | A1 | * | 9/2021 | ........... B66B 11/004 |
| WO | WO-2021259969 | A1 | * | 12/2021 | ............. B66B 19/00 |
| WO | WO-2022069316 | A1 | * | 4/2022 | ............. B66B 19/00 |

OTHER PUBLICATIONS

Machine Translation of WO 2021186493.*
Machine Translation of WO 2022/069316.*
International Search Report PCT/ISA/210 and Written Opinion PCT/ISA/237 for International Application No. PCT/CN2020/140835 on Jun. 9, 2021.

* cited by examiner

CONSTRUCTION ARRANGEMENT OF AN ELEVATOR

CROSS-REFERENCE TO RELATED APPLICATION

This application is a continuation of PCT International Application No. PCT/CN2020/140835 which has an International filing date of Dec. 29, 2020, the entire contents of which are incorporated herein by reference.

FIELD OF THE INVENTION

The invention relates to a construction arrangement of an elevator and more particularly construction-time handling of material in a hoistway of an elevator under construction.

BACKGROUND OF THE INVENTION

When an elevator or a building surrounding it is under construction, there may be installation workers in the lower parts of the elevator hoistway carrying out construction work. Also, the lower parts of the hoistway may already be in construction time transport-use. During construction, there is an increased risk of objects falling into the lower parts of the hoistway. For example, tools or construction material may fall into the hoistway. Persons and components located in the lower parts of the hoistway must be protected from falling objects.

In prior art, the construction arrangement of an elevator has been provided to comprise an overhead protection deck for protecting the portion of the hoistway below it from falling objects, which protection deck comprises a cover extending across the hoistway and covering the hoistway such that it blocks objects from falling into the hoistway below it. Known protection decks have been disclosed in documents EP2636629 B1 and EP3388379 A1, for example.

In a construction arrangement of an elevator, material to be installed needs to be hoisted to its intended position. For this purpose, a material hoist is typically used. The material to be installed may comprise elevator components such as guide rail sections. Typically, also other loads may need to be moved, such as an installation platform. From a working platform the component suspended by the material hoist can be fixed to its location. In prior art, below the protection deck various support structures have been used for supporting elements needed in construction of an elevator. For example, a material hoist has been supported by a structure, such as a beam, mounted below the protection deck.

A drawback of known solutions has been that they have been relatively complicated and a lot of rearranging has been needed during the process during progress of the construction.

BRIEF DESCRIPTION OF THE INVENTION

The object of the invention is to introduce a new construction arrangement of an elevator. An object is to introduce a solution by which one or more of the above defined problems of prior art and/or problems discussed or implied elsewhere in the description can be solved. An object is particularly to introduce a solution by which construction time protection and material hoisting can be provided safely and simply.

Embodiments are presented, inter alia, wherein one or more of the following objects are achieved safely with a simple structure.

- A relatively small amount of lot of rearranging is needed during progress of the construction starting from the bottom of an elevator hoistway.
- Safe yet agile structure enabling material hoisting is achieved.
- Safe material hoisting is achieved, where the hoisting range can be very high.
- Hoisting can be operated by a person from an optimal location.
- Positioning of supporting structures can be freely chosen and easily found and changed according to needs without necessity to rely on pockets specifically made in hoistway walls nor landing openings.
- A protection deck can take vertical support simply at a desired vertical location.
- Hoisting of different loads can be performed simultaneously during construction in a safe and optimized manner.
- Guide rail section and/or landing door installation can be made more efficient.

It is brought forward a new construction arrangement of an elevator comprising a hoistway; and a protection deck mounted inside the hoistway for protecting the portion of the hoistway below it from falling objects; wherein the protection deck comprises a cover extending across the hoistway covering the hoistway, in particular such that it blocks objects from falling into the hoistway below it; and a frame mounted on stationary structures of the hoistway; and a hoisting apparatus for hoisting construction material below the protective deck. The hoisting apparatus is supported by the protective deck, and the hoisting apparatus comprises a hoisting machine mounted on protection deck, and a flexible tension member movable with the hoisting machine.

With this solution one or more of the above-mentioned objects can be achieved.

Preferable further details of the arrangement are introduced in the following, which further details can be combined with the arrangement individually or in any combination.

In a preferred embodiment, the flexible tension member hangs suspended by the hoisting machine, and the flexible tension member is provided with a connector, in particular at a lower end thereof, such as a hook or a gripper for example, connected or connectable with a construction material to be hoisted.

In a preferred embodiment, the arrangement comprises a second hoisting apparatus for hoisting a load below the protective deck supported by the protective deck, said load preferably being an installation platform or a movable machine room of an elevator located below the protection deck or an elevator car below the protection deck.

In a preferred embodiment, the second hoisting apparatus comprises a second hoisting machine and a second flexible tension member movable with the second hoisting machine.

In a preferred embodiment, the protection deck comprises a diverting wheel mounted on the protection deck for guiding and supporting the second flexible tension member.

In a preferred embodiment, the second hoisting machine is mounted on the load and the second flexible tension member passes around the diverting wheel.

In a preferred embodiment, the hoisting apparatus comprises a controller for controlling the hoisting machine in response to drive signals, in particular rotation of a motor thereof, and the controller 1 comprises a receiver for receiving wireless drive signals.

In a preferred embodiment, the arrangement comprises an operating device comprising an interface operable by a user for inputting drive commands of a hoisting apparatus, the operating device being configured to transmit a wireless drive signal in response to a command inputted by the user; and a relay station;

wherein the relay station configured to relay wireless drive signals from the operating device to the hoisting apparatus.

In a preferred embodiment, the relay station is mounted closer to the hoisting machine than where the operating device is disposed.

In a preferred embodiment, the hoisting machine comprises a motor m arranged to rotate a drive wheel dw, the drive wheel being arranged to engage the flexible tension member. The drive wheel can be any kind of drive wheel but preferably it is a drum wheel around which the flexible tension member can be reeled by rotation of the drive wheel. Alternatively it could be any other kind of engagement such as by friction or positive engagement for producing pull on the flexible tension member.

In a preferred embodiment, the operating device comprises a controller configured to communicate wirelessly with a controller of the relay station and the controller of the relay station is configured to communicate wirelessly with a controller of the hoisting apparatus.

In a preferred embodiment, the operating device is lower than protection deck and said relay station.

In a preferred embodiment, the arrangement comprises inside the hoistway a storage of guide rail sections to be installed resting on top of the protection deck.

In a preferred embodiment, the arrangement comprises inside the hoistway a storage of landing doors to be installed resting on top of the protection deck.

In a preferred embodiment, the arrangement comprises at least one further protection deck mounted inside the hoistway for protecting the portion of the hoistway below it from falling objects, which further protection deck as defined in any of the preceding claims, and the arrangement comprises inside the hoistway a storage of landing doors to be installed resting on top of the further protection deck.

In a preferred embodiment, said stationary structures are opposite vertical wall faces of the hoistway.

In a preferred embodiment, the frame is fixed to opposite vertical wall faces of the hoistway.

In a preferred embodiment, the frame comprises an elongated fixing member, which is oriented horizontally, on each of its sides which are opposite sides of the frame in width direction of the hoistway, and said elongated fixing members are fixed against opposite vertical wall faces of the hoistway. It is preferred, that said elongated fixing members are fixed against opposite vertical wall faces of the hoistway with bolts, preferably extending into holes of the wall of the hoistway, which hoistway wall preferably comprises concrete.

In a preferred embodiment, the width i.e. the size of the frame in width direction of the hoistway of the frame is preferably adjustable.

In a preferred embodiment, the frame comprises plurality of beams oriented horizontally and such that their longitudinal axes are parallel with width direction of the hoistway. The beams are on the same vertical level and disposed adjacent each other in depth direction of the hoistway.

In a preferred embodiment, the said elongated fixing members are fixed on opposite ends of the beams.

In a preferred embodiment, the frame comprises at least four of said beams, preferably more, most preferably 5-10.

In a preferred embodiment, the beams are telescopic beams.

In a preferred embodiment, the protection deck comprises a supporting beam connected pivotally to the frame, and a diverting wheel (also referred to as a "first diverting wheel") mounted on said supporting beam, the flexible tension member being guided to pass from the hoisting machine to the diverting wheel, over it and from the diverting wheel downwards in the hoistway.

In a preferred embodiment, the supporting beam is more specifically connected to the frame pivotally around a vertical axis x and/or a horizontal axis x2 relative to the frame.

In a preferred embodiment, the supporting beam is located inside the hoistway below the cover. Thereby it is also protected by the cover.

In a preferred embodiment, the supporting beam is located inside the hoistway below the frame. Thereby it is simply supported and the movement thereof is relatively free such that the flexible tension member will not contact parts of the frame.

In a preferred embodiment, the first diverting wheel is supported by the beam at a distance from said axis x whereby when the supporting beam is pivoted around said axis, the diverting wheel moves along a circular path around said vertical axis x at a distance thereof.

In a preferred embodiment, the first diverting wheel is supported by the beam at a distance from said axis x2 whereby when the supporting beam is pivoted around said axis, the diverting wheel moves along a circular path around said horizontal axis x2 at a distance thereof.

In a preferred embodiment, the location of the first diverting wheel relative to the frame being adjustable by pivoting the supporting beam around said axis x and/or said axis x2.

In a preferred embodiment, The horizontal position of the section of the flexible tension member that extends from the first diverting wheel downwards in the hoistway is thereby adjustable by pivoting the supporting beam around said axis x and/or said axis x2

In a preferred embodiment, The horizontal position of the connector supported by the section of the flexible tension member that extends from the first diverting wheel downwards in the hoistway is thereby adjustable by pivoting the supporting beam around said axis x and/or said axis x2

In a preferred embodiment, the protection deck comprises a second diverting wheel for guiding the flexible tension member to pass from the hoisting machine to the (first) diverting wheel.

In a preferred embodiment, the hoisting machine is higher than the first and second diverting wheels, preferably higher than the upper face of the cover, and the flexible tension member is guided to pass from the hoisting machine to the diverting wheel, to pass under it, and from the flexible tension member to pass from the hoisting machine to the first diverting wheel, over it and from the first diverting wheel downwards in the hoistway.

In a preferred embodiment, the hoisting machine is at least partially above the upper face of the cover, and the protection deck comprises a passage through which the flexible tension member is guided to pass from the hoisting machine to the first diverting wheel.

In a preferred embodiment, the frame comprises a vertically oriented tube forming said passage.

In a preferred embodiment, the supporting beam comprises a cylinder mounted around the tube, the tube serving as a hinge shaft of a hinge structure, and the cylinder serving as a hinge housing of a hinge structure, which are pivotal around each other.

In a preferred embodiment, an abutment extending below the cylinder is provided at the lower end of the tube for holding the cylinder from moving downwards In a preferred embodiment, the supporting beam is located inside the hoistway below the cover, whereby it is also protected by the cover.

In a preferred embodiment, the supporting beam is located inside the hoistway below the frame whereby it is simply supported and the movement thereof is relatively free such that the flexible tension member will not contact parts of the frame.

In a preferred embodiment, the cover has a planar upper face. The planar upper face is preferably horizontal. The area of the planar horizontal upper face is preferably at least 1 m2, preferably more.

In a preferred embodiment, the hoisting machine is higher than the upper face of the cover.

In a preferred embodiment, the cover covers at least 90 percent of the cross sectional area of the hoistway.

In a preferred embodiment, the arrangement comprises an elevator car mounted lower than the protection deck. Preferably, the elevator car is mounted on guide rail lines comprising guide rail sections mounted lower than said protection deck.

The elevator being constructed is preferably an elevator for transporting passengers and/or goods. Preferably, the elevator car has an interior space suitable for receiving a passenger or passengers, and the car can be provided with a door for forming a closed interior space.

BRIEF DESCRIPTION OF THE DRAWINGS

In the following, the present invention will be described in more detail by way of example and with reference to the attached drawings, in which.

The foregoing aspects, features and advantages of the invention will be apparent from the drawings and the detailed description related thereto.

DETAILED DESCRIPTION

Figure 1:
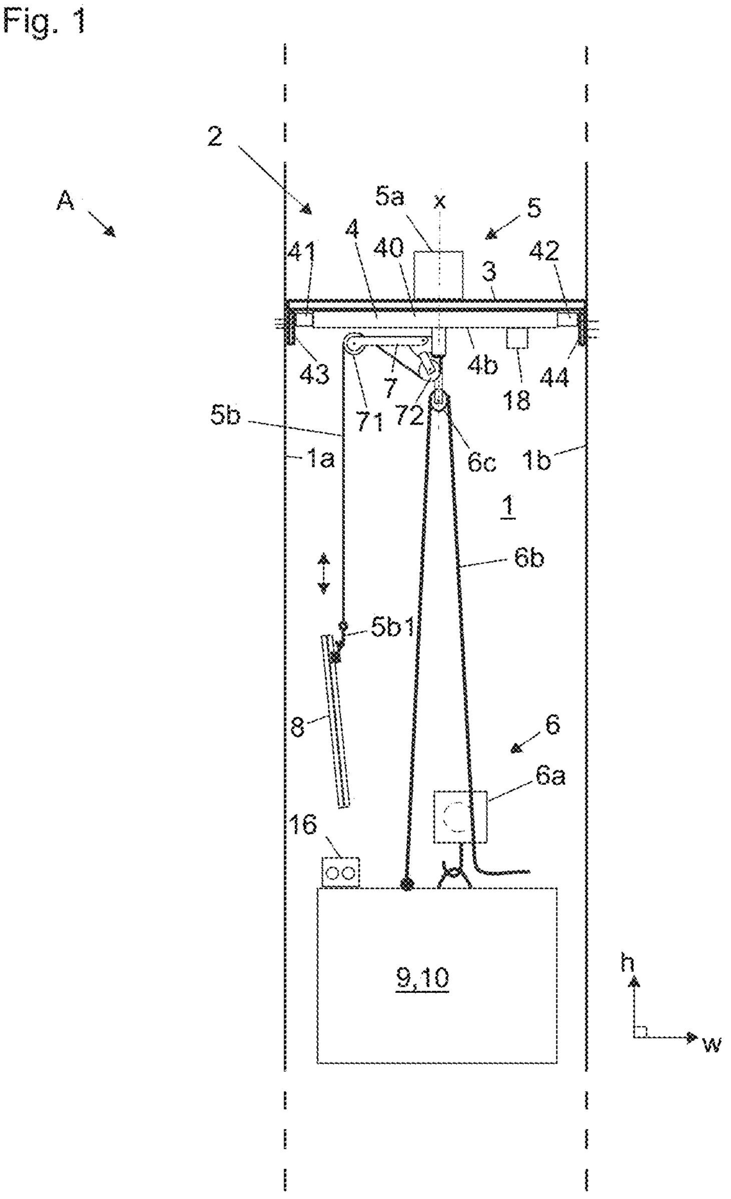
FIG. 1 illustrates schematically an embodiment of a construction arrangement of an elevator comprising a protection deck mounted in a hoistway.

FIG. 1 illustrates a construction arrangement A of an elevator comprising a hoistway 1 formed inside a building, and a protection deck 2 mounted inside the hoistway 1 for protecting the portion of the hoistway 1 below it from falling objects. The protection deck 2 comprises a cover 3 extending across the hoistway 1 covering the hoistway 1 such that it blocks objects from falling into the hoistway 1 below it, and a frame 4 mounted on stationary structures **1*a*,1*b* of the hoistway 1. The cover 3 is preferably mounted on the frame 4**.

The protection deck 2 comprises a hoisting apparatus 5 for hoisting construction material below the protective deck 2. The hoisting apparatus 5 is supported by the protective deck 2. The hoisting apparatus 5 comprises a hoisting machine **5*a* mounted on the protection deck 2, preferably in particular on the frame 4** thereof, and a flexible tension member Sb movable with the hoisting machine Sa.

The hoisting machine Sa being mounted on the protection deck 2 in this way, provides that an ability of efficient material hoisting becomes provided in a high portion of the hoistway simply, the material hoisting equipment thus also being automatically repositionable together with the protection deck 2 inside the hoistway 1.

As illustrated in FIG. 1, the flexible tension member Sb hangs suspended by the hoisting machine Sa, and the flexible tension member Sb is provided with a connector **5*b*1 at a lower end thereof, such as a hook for example, connected or connectable with a construction material 8 to be hoisted. In the arrangement of FIG. 1, the connector 5*b*1 is connected with a construction material 8 to be hoisted, which construction material 8** is a guide rail section.

Figure 2:
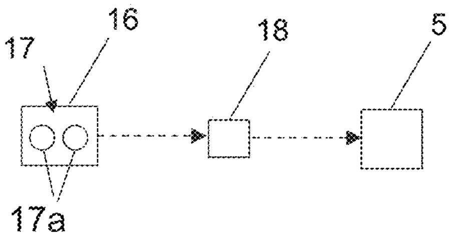
FIG. 2 illustrates preferred details of connections of an operating device, a relay station and a hoisting device.
Figure 3:
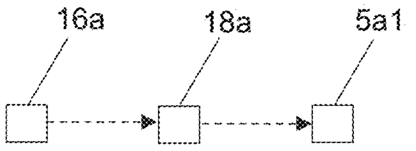
FIG. 3 illustrates preferred details of an operating device, a relay station and a hoisting device as well as connections FIG. 2.

A challenge in mounting the machine Sa of the material hoisting apparatus 5 on the protection deck 2 is that the protection deck 2 often needs to be very high above the level of the connector **5*b*1 of the material hoisting apparatus 5 as well as high above the level on which the construction work needs to be performed. Thereby, the hoisting machine 5*a* is also far from the level on which a person must supervise and control the material hoisting. This makes it difficult to simply and reliably transmit control signals to the hoisting machine 5*a*. In a preferred embodiment, the hoisting apparatus 5 of FIG. 1 comprises a controller 5*a*1 for controlling the hoisting machine 5*a*, in particular rotation of a motor thereof, in response to drive signals, and the controller 5*a*1 comprises a receiver for receiving wireless drive signals. The preferred details have been illustrated in FIGS. 2 and 3. The hoisting can be controlled relatively freely through a wireless connection. For facilitating reliability of transmission of the drive signals, in particular from far below the hoisting machine 5*a*, the arrangement comprises an operating device 16 comprising an interface 17 operable by a user for inputting drive commands of a hoisting apparatus 5, the operating device 16 being configured to transmit a wireless drive signal in response to a command inputted by the user; and a relay station 18; wherein the relay station 18 configured to relay wireless drive signals from the operating device 16 to the hoisting apparatus 5, in particular to said a controller Sal thereof. The relay station 18 facilitates reliability of transmission, and it can be positioned such that it can reliably relay signals as desired. Positioning of a relay station is relatively simple, while positioning of the interface 17** or the hoisting apparatus cannot be freely chosen so as to ensure good transmission.

Preferably, the relay station 18 is mounted closer to the hoisting machine Sa than where the operating device 16 is disposed. The relay station, however also facilitates communication also even if it is not really closer to the hoisting apparatus, but offers an alternative or additional route for the signal, e.g. so as to go around an obstacle such as a concrete floor or wall, for example, which might be relevant when trying to operate the hoisting apparatus using an operating device on a landing.

Preferably, the relay station 18 is mounted inside the hoistway. Thus, the arrangement is reliable in most situations, such as for example when a person standing on a landing operates an operating device 16 also located at a landing. With help of the relay station 18, control signals can be reliably relayed to the hoisting apparatus 5. The relay station 18 can be optimized for this kind of use, in particular in terms of sensitivity of receiving weak signals and sending strong signals, e.g. able to penetrate through structures.

The arrangement is preferably particularly such that the operating device 16 comprises a controller 16*a* configured to communicate wirelessly with a controller 18*a* of the relay station 18 and the controller 18*a* of the relay station 18 is configured to communicate wirelessly with a controller Sal of the hoisting apparatus.

In FIG. 1, the operating device 16 is lower than protection deck 2 and said relay station 18. This is a typical situation where the arrangement is most advantageous.

The frame 4 is fixed to opposite vertical wall faces 1*a*-1*b* of the hoistway 1.

The frame 4 comprises an elongated fixing member 43,44, which is oriented horizontally (i.e. its longitudinal axis is horizontal), on each of its sides which are opposite sides of the frame in width direction w, and said elongated fixing members 43,44 are fixed against opposite vertical wall 1*a*,1*b* faces of the hoistway 1. It is preferred, as illustrated in FIG. 1, that said elongated fixing members 43,44 are fixed against opposite vertical wall 1*a*,1*b* faces of the hoistway 1 with bolts, preferably extending into holes of the wall of the hoistway 1, which hoistway wall preferably comprises concrete.

The width of the frame 4 is preferably adjustable. Features facilitating adjustability have been disclosed in detail in FIGS. 4-5. For this purpose, the frame 4 comprises plurality of beams 40 oriented horizontally (i.e. their longitudinal axes are horizontal) and such that their longitudinal axes are parallel with width direction w of the hoistway 1. The beams 40 are on the same vertical level and disposed adjacent each other in depth direction d of the hoistway 1.

Figure 4:
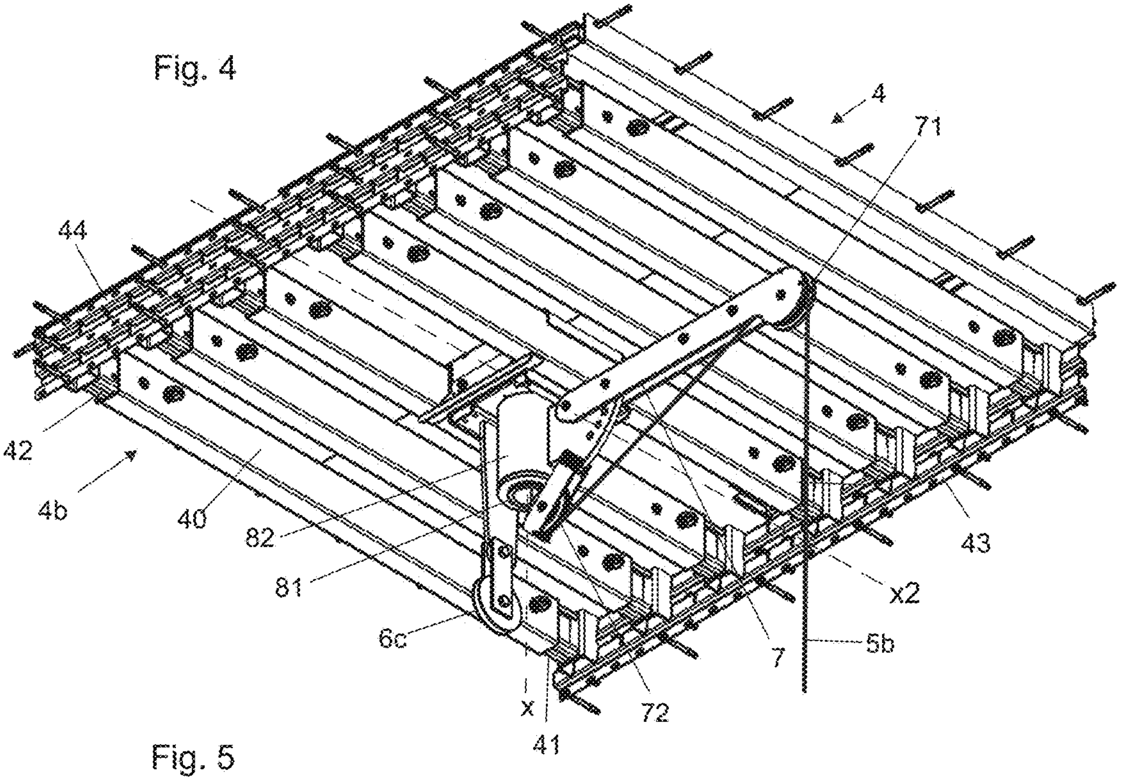
FIG. 4 illustrates as a partial perspective view preferred details of the arrangement of FIG. 1.
Figure 5:
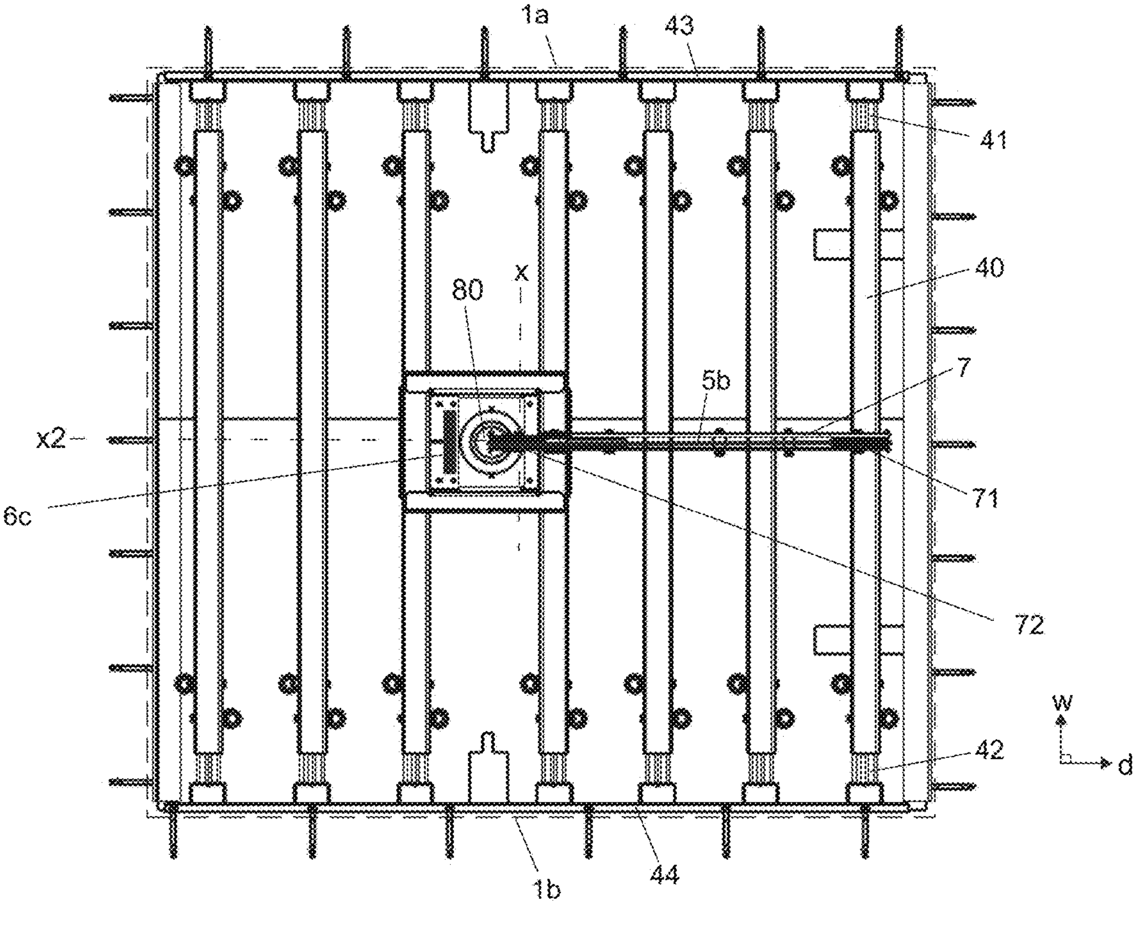
FIG. 5 illustrates from below details of FIG. 4.
Figure 6:
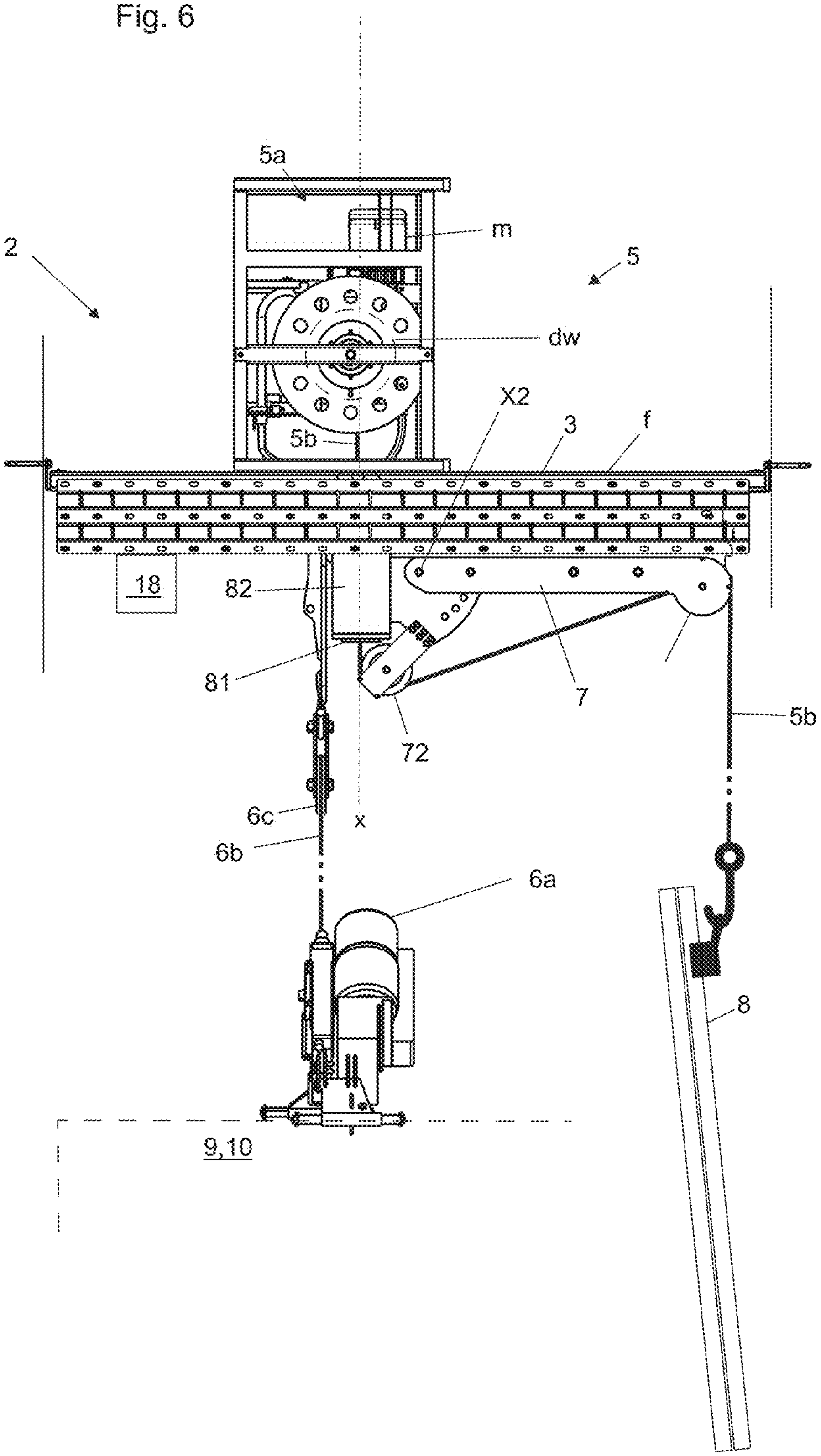
FIG. 6 illustrates from side details of FIG. 4 and preferred details of the arrangement of FIG. 1.

The frame 4 comprises at least four of said beams 4*b*, preferably more, most preferably 5-10, such as 7 as illustrated in FIGS. 4-5.

Said elongated fixing members 43,44 are fixed on opposite ends of the beams 4*b*. The beams 4*b* are preferably telescopic beams. Each said telescopic beam 4*b* preferably comprises a central beam 40 and two end beams 41,42 mounted movably on the central beam. The two end beams 41,42 preferably are mounted movably inside the central beam, in particular such that their ends extend out from the inner space of the central beam 40.

The protection deck 2 comprises a supporting beam 7 connected pivotally to the frame 4, and a diverting wheel 71 mounted on said supporting beam 7. The flexible tension member Sb is guided to pass from the hoisting machine Sa to the diverting wheel 71, over it and from the diverting wheel 71 downwards in the hoistway 1.

The supporting beam 7 is more specifically connected to the frame 4 pivotally around a vertical axis x as well as around a horizontal axis x2 relative to the frame 4.

The diverting wheel 71 is supported by the beam 7 at a distance from said axis x whereby when the supporting beam 7 is pivoted around said axis x, the diverting wheel 71 moves along a circular path around said vertical axis x at a distance thereof.

The diverting wheel 71 is supported by the beam 7 at a distance from said axis x2 whereby when the supporting beam 7 is pivoted around said axis, the diverting wheel 71 moves along a circular path around said horizontal axis x2 at a distance thereof.

The location of the diverting wheel 71 relative to the frame is adjustable by pivoting the supporting beam 7 around said axis x and/or said axis x2.

Pivotability around a vertical axis and a horizontal axis is very advantageous since it provides very flexible movability of the diverting wheel 71. However, pivotability around both of said axes is not necessary since some of the advantages can be achieved also if the supporting beam 7 is pivotal around only one of said axes x,x2, in which case the supporting beam 7 is pivotal most preferably around the vertical axis x. FIG. 4 illustrates a configuration where the supporting beam 7 has been pivoted 90 degrees around the vertical axis x as compared to configuration of FIG. 1.

The horizontal position of the section of the flexible tension member 5*b* that extends from the diverting wheel 71 downwards in the hoistway 1 is adjustable by pivoting the supporting beam 7 around said axis x and/or said axis x2.

The horizontal position of the connector 5*b*1 supported by the section of the flexible tension member 5*b* that extends from the diverting wheel 71 downwards in the hoistway 1 is thereby adjustable by pivoting the supporting beam 7 around said axis x and/or said axis x2.

Pivotal nature of the supporting beam 7 provides that the location of the hoisting machine 5*a* relative to the frame 4 can be simply and relatively freely adjusted, and thereby the hoisting point made optimal for the material hoisting operations occurring at different horizontal positions of the hoistway 1.

Guidance of the tension member Sb is moreover preferably provided as will be hereinafter described. The protection deck 2 comprises a second diverting wheel 72 for guiding the flexible tension member Sb to pass from the hoisting machine Sa to the diverting wheel 71.

The hoisting machine Sa is higher than the diverting wheels 71 and 72, and preferably also higher than the upper face f of the cover 3, and the flexible tension member Sb is guide to pass from the hoisting machine Sa to the diverting wheel 72, to pass under it, and from the flexible tension member Sb to pass from the hoisting machine Sa to the diverting wheel 71, over it and from the diverting wheel 71 downwards in the hoistway 1.

The hoisting machine 5*a* is at least partially above the upper face f of the cover 3, and the protection deck 2 comprises a passage 80 through which the flexible tension member 5*b* is guided to pass from the hoisting machine 5*a* to the diverting wheel 72. The frame 4 comprises a vertically oriented tube 81 forming said passage 80. The supporting beam 7 comprises a cylinder 82 mounted around the tube 81, the tube serving as a hinge shaft of a hinge structure, and the cylinder serving as a hinge housing of a hinge structure, which are pivotal around each other. An abutment extending below the cylinder is provided at the lower end of the tube for holding the cylinder from moving downwards.

The material hoisting apparatus 5 is be well optimized for agile material hoisting. There is however often need for hoisting of large loads such as: an installation platform or a movable machine room of an elevator located below the protection deck 2 or an elevator car 100 below the protection deck 2. For this purpose, the arrangement comprises a second hoisting apparatus 6 for hoisting a load 9,10 below the protective deck 1 supported by the protective deck 1, said load preferably being an installation platform or a movable machine room of an elevator located below the protection deck 2, for example. The second hoisting apparatus 6 comprises a second hoisting machine 6*a* and a second flexible tension member 6*b* movable with the second hoisting machine 6*a*.

The nominal load of the hoisting machine 5*a* of the hoisting apparatus 5 also referred to as the "first" hoisting apparatus 5 can be different than the nominal load of the hoisting machine 6*a* of the second hoisting apparatus 6. Preferably, the nominal load of the hoisting machine 5*a* of the first hoisting apparatus 5 is smaller than the nominal load of the hoisting machine 6*a* of the second hoisting apparatus 6.

The hoisting capacity of the second hoisting apparatus 6 can be increased by utilizing a diverting wheel 6*c*. Accordingly, for increasing the hoisting capacity, a diverting wheel 6*c* has been mounted on the protection deck 2 for guiding and supporting the second flexible tension member 6*b*. This also enables mounting of the hoisting machine 6*a* separate from the protection deck 2. In the embodiment of FIG. 1, the second hoisting machine 6*a* is be mounted on the load 9,10 and the second flexible tension member 6*b* passes around the diverting wheel 6*c*.

Figure 7:
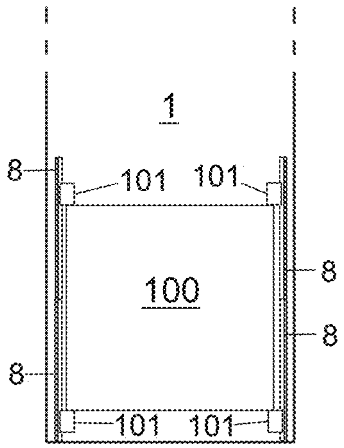
FIG. 7 illustrates further preferred details of the arrangement A.

FIG. 7 illustrates further preferred details of the arrangement A, in particular details of the arrangement at the lower end of the hoistway 1. The parts showed in FIGS. 1-6 are higher than the parts showed in FIG. 7, so these are not shown in FIG. 7. As illustrated, it is preferred that the arrangement A comprises an elevator car 100 mounted lower than the protection deck 2. TAs illustrated in FIG. 7, the elevator car 100 is mounted on guide rail lines comprising guide rail sections 8, via guide members 101 such as roller or slide guides for example. The arrangement A concerns an elevator under construction particularly. Thus, the car may or may not be movable at the moment illustrated. Respectively, the car 100 may form a car of a jump lift or a conventional elevator.

Figure 8:
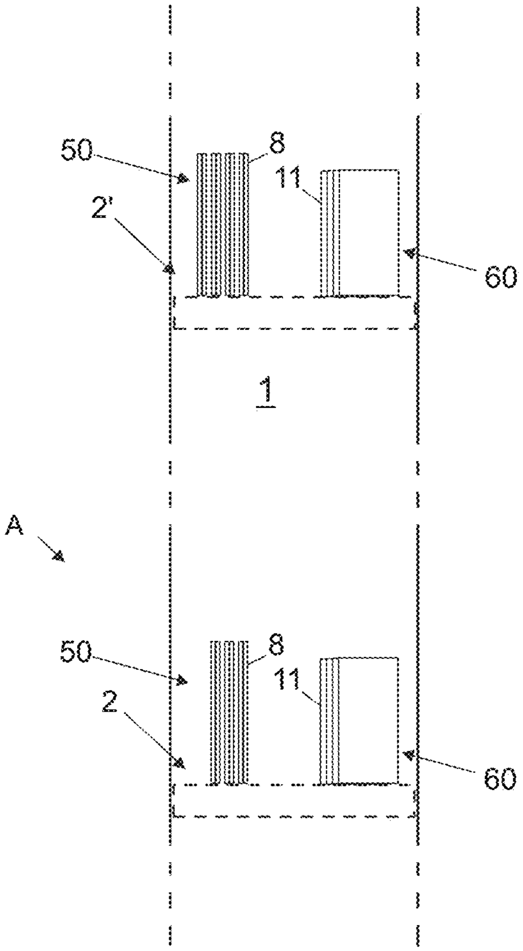
FIG. 8 illustrates a further embodiment utilizing the arrangement and protection deck of FIGS. 1-7.

FIG. 8 illustrates a further embodiment utilizing the arrangement A and protection deck 2 of FIGS. 1-7. The protection deck 2 and features connected to it are illustrated in broken line, and are as illustrated and described referring to FIG. 1.

In this embodiment, the arrangement A comprises inside the hoistway 1 a storage 50 of guide rail sections 8 to be installed resting on top of the protection deck 2. The arrangement comprises inside the hoistway a storage 60 of landing doors 11 to be installed resting on top of the protection deck 2. Storing the landing doors 11 and/or guide rail sections 8 on the protection deck 2 provides that the hoistway 1 is is protected while at the same time construction thereof is made quick and efficient. Landing doors 11 and/or guide rail sections 8 resting on the protection deck 2 can be installed above or below the protection deck 2 simply and quickly.

In FIG. 8, the arrangement A comprises at least one further protection deck 2' mounted inside the hoistway 1 for protecting the portion of the hoistway 1 below it from falling objects, which further protection deck 2' is as defined in any of the preceding claims, and the arrangement A comprises inside the hoistway 1 a storage 50 of landing doors 11 to be installed resting on top of the further protection deck 2' and/or a storage 60 of guide rail sections 8 to be installed resting on top of the further protection deck 2'.

At an early phase of construction work, landing doors 11 and/or guide rail sections 8 can be distributed to vertically spaced apart locations inside the hoistway to be stored therein. Thus, when the construction of an elevator proceeds such that it reaches a first level, guide rail sections 8 and/or landing doors 11 resting on a protection deck 2 can be installed above or below the protection deck 2 in question simply and quickly. After this, when the construction of an elevator proceeds further such that it reaches a second level, guide rail sections 8 and/or landing doors 11 resting on the further protection deck 2' can be installed above or below the further protection deck 2' in question simply and quickly.

In general, preferably the cover 3 has a planar upper face. The upper planar upper face is preferably horizontal. This facilitates using the protection deck as a platform where a person can stand and/or as a platform on which a storage 50 and/or 60 can be provided. The area of the horizontal upper face is preferably at least 1 m2, preferably more.

In general, preferably the cover 3 covers at least 90 percent of the cross sectional area of the hoistway 1.

In general, the cover 3 is preferably such that it comprises one or more plate elements. The one or more plate elements can form a layer structure In the application, several details for the arrangement have been presented as preferred. This means that they are preferred, however they are not to be understood as necessary, because it may be that the arrangement can be implemented also without them.

It is to be understood that the above description and the accompanying Figures are only intended to teach the best way known to the inventors to make and use the invention. It will be apparent to a person skilled in the art that the inventive concept can be implemented in various ways. The above-described embodiments of the invention may thus be modified or varied, without departing from the invention, as appreciated by those skilled in the art in light of the above teachings. It is therefore to be understood that the invention and its embodiments are not limited to the examples described above but may vary within the scope of the claims.

What is claimed is:

1. A construction arrangement of an elevator comprising:
a hoistway; and
a protection deck mounted inside the hoistway for protecting a portion of the hoistway below the protection deck from falling objects;
wherein the protection deck comprises
a cover extending across the hoistway and covering the hoistway such that the cover blocks objects from falling into the hoistway below the protection deck;
a frame mounted on stationary structures of the hoistway; and
a hoisting apparatus for hoisting construction material below the protection deck;
wherein the hoisting apparatus is supported by the protection deck, the hoisting apparatus comprising a hoisting machine mounted on the protection deck and a flexible tension member movably driven by the hoisting machine, and
wherein the protection deck comprises a supporting beam connected pivotally to the frame, and a diverting wheel mounted on said supporting beam, the flexible tension member being guided to pass from the hoisting machine to the diverting wheel, over the diverting wheel and from the diverting wheel downwards in the hoistway.

2. An arrangement according to claim 1, wherein the supporting beam is connected to the frame pivotally around a vertical axis and/or around a horizontal axis relative to the frame.

3. An arrangement according to claim 2, wherein the diverting wheel is supported by the supporting beam at a distance from said vertical axis whereby when the supporting beam is pivoted around said vertical axis, the diverting wheel moves along a circular path around said vertical axis at the distance thereof.

4. An arrangement according to claim 2, wherein the diverting wheel is supported by the supporting beam at a distance from said horizontal axis whereby when the supporting beam is pivoted around said horizontal axis, the diverting wheel moves along a circular path around said horizontal axis at the distance thereof.

5. An arrangement according to claim 2, wherein a location of the diverting wheel relative to the frame is adjustable by pivoting the supporting beam around said vertical axis and/or said horizontal axis.

6. An arrangement according to claim 2, wherein the protection deck comprises a second diverting wheel for guiding the flexible tension member to pass from the hoisting machine to the diverting wheel.

7. An arrangement according to claim 6, wherein the hoisting machine is higher than the diverting wheels and an upper face of the cover, and the flexible tension member is guided to pass from the hoisting machine to the second diverting wheel, to pass under the second diverting wheel, and from the second diverting wheel to pass to the diverting wheel, over the diverting wheel and from the diverting wheel downwards in the hoistway.

8. An arrangement according to claim 1, wherein the hoisting machine is higher than an upper face of the cover.

9. A construction arrangement of an elevator comprising:

a hoistway; and a protection deck mounted inside the hoistway for protecting a portion of the hoistway below the protection deck from falling objects;

wherein the protection deck comprises a cover extending across the hoistway and covering the hoistway such that the cover blocks objects from falling into the hoistway below the protection deck;

a frame mounted on stationary structures of the hoistway, the cover being directly mounted on the frame; and a first hoisting apparatus for hoisting construction material below the protection deck;

wherein the first hoisting apparatus is supported by the protective deck, the first hoisting apparatus comprising a first hoisting machine mounted on the protection deck, a first diverting wheel supported by the protection deck, and a first flexible tension member movably driven by the first hoisting machine, the first diverting wheel for guiding and supporting the first flexible tension member, and wherein the construction arrangement further comprises a second hoisting apparatus for hoisting a load below the protective deck, the second hoisting apparatus including a second hoisting machine mounted on the load, a second diverting wheel supported by the protection deck, and a second flexible tension member movably driven by the second hoisting machine.

10. An arrangement according to claim 9, wherein the second flexible tension member includes a first end movably coupled to the second hoisting machine and a second end fixedly attached to the load, and the second flexible tension member is arranged to pass over the second diverting wheel.

11. An arrangement according to claim 9, wherein the first hoisting machine is higher than an upper face of the cover.

12. An arrangement according to claim 9, further comprising an elevator car mounted lower than the protection deck.

* * * * *